United States Patent [19]
Lam et al.

[11] Patent Number: 5,698,158
[45] Date of Patent: Dec. 16, 1997

[54] VACUUM DISTILLATION APPARATUS FOR PRODUCING ULTRA HIGH PURITY MATERIAL

[75] Inventors: Raymond K. F. Lam, Park Ridge; Daniel R. Marx, West Caldwell, both of N.J.

[73] Assignees: Sony Corporation, Tokyo, Japan; Materials Research Corporation, Orangeburg, N.Y.

[21] Appl. No.: 743,472

[22] Filed: Nov. 4, 1996

Related U.S. Application Data

[62] Division of Ser. No. 391,047, Feb. 21, 1995, Pat. No. 5,582,630.

[51] Int. Cl.$^6$ .......................................... C22B 4/08
[52] U.S. Cl. ........................... 266/87; 266/149; 373/111; 373/112; 373/136
[58] Field of Search .................... 373/111, 112, 373/136; 266/149, 87

[56] References Cited

U.S. PATENT DOCUMENTS 3,767,381 10/1973 Bielefeldt .
5,078,789 1/1992 Abodishish et al. ............... 266/149

FOREIGN PATENT DOCUMENTS 49-30211 3/1974 Japan .
997402 7/1965 United Kingdom .

OTHER PUBLICATIONS

Patent Abstracts of Japan, vol. 008 No. 067 (C–216); 29 Mar. 1984 & JP, A, 58 221242 (Nippon Jukagaku Kogypo KK) 22 Dec. 1983.

"Purification of Magnesium by Vacuum Distillation" by G. Revel, et al., *1987 The American Society For Metals And The Metallurgical Society of AIME*, Metallurgical Transactions B, Dec. 1978, pp. 665–672.

"Purification du magnesium par distillation sous vide", or Purification of Magnesium by Vacuum Distillation by G. Revel, et al., Cent. Etud. Chim, Metall.; Vitry–sur–Seine, France; *C. R. Hebd, Seances Acad. Sci. Paris*, t.281, 22 Dec. 1975, Serie C, pp. 1065–1068.

"The Refining of Magnesium", *The Refining of Non–Ferrous Metals* by E: F. Emley, The Institution of Mining and Metallurgy, London 1950, pp. 407–443. Month Unavailable.

"Furance for Refining of Magnesium" by O. Wallevik nd J. B. Ronhaug; *Extractive Metallurgy, Developments Since 1980*, assigned to Norsk Hydro AS, Norway, Abstract of U.S. Patent No. 4,385,931, May 31, 1983.

*Primary Examiner*—Melvyn Andrews
*Attorney, Agent, or Firm*—Wood, Herron & Evans, L.L.P.

[57] ABSTRACT

Ultra high purity materials, particularly metallic materials such as magnesium and similarly high volatility materials, are produced by a vacuum distillation method and apparatus to increase purity by approximately five hundred times in a single step. For example, magnesium purity, exclusive of zinc content, is increased from 99.95% to greater than 99.9999%. A distillation column is formed of a high purity (less than 10 ppm ash) graphite, and includes a crucible, a vertical condenser in which horizontal high purity graphite baffles are selectively located at a plurality of levels, for example at nine levels. The column is contained in a three-zone resistance furnace that is controlled to heat the crucible to evaporate the material, maintain the condenser immediately above the crucible to above the boiling point of the material, and maintain the portion of the column thereabove at below the boiling point of the material, preferably with the temperature gradually decreasing with the height of the column. The baffles are spaced along the condenser and are staggered to slow the vapors such that the high purity material reaches its condensation temperature and condenses on one or more selected ones of the baffles. The condenser is split so the baffles can be selectively placed and removed to remove the purified material. Caps at the top and bottom of the column hold the split condenser together.

11 Claims, 2 Drawing Sheets

VACUUM DISTILLATION APPARATUS FOR PRODUCING ULTRA HIGH PURITY MATERIAL

This application is a division of application Ser. No. 08/391,047 filed Feb. 21, 1995 now U.S. Pat. No. 5,582,630.

The present invention relates to purification of metals such as magnesium and metals of comparable volatility, and more particularly, to a vacuum distillation method and apparatus for the production such metals of ultra high purity, as, for example, 99.9999% purity magnesium.

BACKGROUND OF THE INVENTION

In the manufacture of semiconductor devices, high purity materials are in great demand. The fabrication of semiconductor devices such as, for example, blue-light laser diodes presents a demand for ultra high purity magnesium metal. The development of double heterostructure blue-laser diode devices is particularly dependent on the quality of the material used for a cladding layer. One such material, a II-VI magnesium-containing compound ZnMgSSe grown by molecular beam epitaxy (MBE), is a highly effective material for cladding active p-type ZnSSe layers in the compound devices. This material can be lattice-matched to GaAs, and has a band-gap energy that is at least 0.3 eV higher than the active ZnSSe layer. Alternative magnesium semiconductor compounds, such as MgZnCdS, may be used to fabricate other color laser diodes.

Metallic impurities in such materials used for such cladding and other purposes are detrimental to the performance of semiconductor lasers. While high purity (99.9999%, or 6N[ine]pure) Zn, Se, S, and ZnS are employed in ZnMgSSe production, magnesium of only 4N pure (99.99% pure) is generally commercially available. Further, the highest purity of magnesium, considering all metallic impurities except zinc, that is currently available for research is between 99.9997% to 99.9998% metallic purity (high 5N pure). Such material is produced in a multi-step process by Dowa of Japan and is available at a price that is relatively high. But for color laser diode and many other semiconductor device applications, at least 6N purity magnesium is desirable.

The previously known methods for producing purified magnesium metals include the processes of zone refining, electro-refining, flux addition, precipitation, metallothermic reduction and distillation. The process of vacuum distillation, however, tends to produce the highest purity magnesium.

Purification of magnesium metal by vacuum distillation has been proposed, for example, by condensing magnesium vapor on a flat plate. Often, to achieve higher purities, magnesium must be distilled in two or more stages, at greater complexity and expense. It has been proposed to post-treat distilled magnesium with argon vapor, or to conduct a first distillation stage in the presence of argon and the second without argon. It has alternatively been proposed to purify magnesium in its molten state, for example by descending the liquid metal through a furnace or by melting the vapor deposited metal and purifying it in two or more stages.

Researchers have described purifying magnesium to greater than 99.999% purity with distillation columns formed of stainless steel and using graphite crucibles. Such process are claimed to produce 99.9995% to 99.9996% total metallic purity magnesium. Such columns have employed single-zone heaters and no temperature control over the distillation extent of the condenser. The total metallic purity, and the metallic purity excluding zinc content, of distilled magnesium has been reported at 99.9996% and 99.999905%, respectively, with zinc content being three ppm. These purities were attained, however, by using successive multiple distillations.

Researchers have also described employing columns with bubble-caps and shelf plates to purify magnesium, or the use of electromagnetic fields to increase purification capability. Magnesium alloys and magnesium sponge have also been described as purified by vacuum distillation. Other metals, alloys, and chemical compounds have been purified by vacuum distillation, including tellurium, neodymium, manganese, zinc, calcium, zirconium, titanium, aluminum alloy, silver iodide, and chlorides.

Other methods of purifying magnesium have been used including zone refining and electro-refining. Zone refining has been suggested using a horizontal graphite crucible. The electro-refining has been proposed using mixtures of chlorides, fluorides or oxides as electrolytes. The addition of flux, such as alkalis, alkali earth chlorides or fluorides, or boron or titanium halides, to molten magnesium has also been proposed to remove specific impurities. Impurity precipitation and thermal processing have been noted in literature, including metallothermic reduction and impurity oxide or halide reduction by silicon, zirconium, titanium or manganese.

Notwithstanding all of the efforts that have been expended to effectively and economically produce high purity materials such as magnesium at greater than 6N purity, the prior art has failed to produce magnesium and other such materials at such purity or to approach such purity from less than 4N purity material in a single step process at a reasonable price. Accordingly, there remains a continuing need for a method and apparatus for the effective and economical production of such high purity materials.

SUMMARY OF THE INVENTION

It is an objective of the present invention to provide for highly pure materials such as magnesium, and provide a method and apparatus to do so at moderate cost. It is a more particular objective of the present invention to provide for the production of magnesium metal having a total content of all metallic impurities, exclusive of zinc, of less than one part per million. Due to the composition of the compounds being formed and the processes involved, small amounts of zinc are not harmful and need not be regarded as an impurity.

It is a further objective of the present invention to provide a vapor distillation method of purifying materials, as for example materials such as magnesium or metals of comparable volatility, to high purity in a single distillation stage. Such other materials include arsenic, potassium, cadmium, sodium and zinc, for example. It is still a further objective of the present invention to provide a vapor distillation apparatus for purifying materials, particularly materials such as magnesium, in a single stage. It is a more particular objective of the present invention to provide a method and apparatus for purifying materials by vapor distillation in a vacuum and in which the purity of the purified material can be enhanced by the ability to vary, set or control parameters of the distillation process such as the temperature and temperature variation throughout the apparatus or process and the location of the condensation of the purified material in the apparatus or process.

In accordance with the preferred embodiment of the present invention, there is provided an apparatus and a process for purifying material such as magnesium metal from, for example, 99.95% initially to greater than 99.9999% purity. Such purity, referred to as ultra high purity herein, of magnesium metal, for example, is highly effective for use in the fabrication of blue light laser diodes, and will enhance the development of services such as blue-light laser diodes. The apparatus in accordance with the preferred embodiment of the invention employs a condenser that is made preferably of high purity graphite, less than 10 ppm ash, and includes a graphite baffle assembly that provides baffles at various and variable levels along the condenser path. Preferably, the condenser is in the form of a split vertical column that can be opened to provide for the selective placing of the baffles at any of a plurality of positions therein, to control the upward flow of vapor in a preferably staggered path and to provide a series of differently maintained condensation points for the selective removal of the purified metal or impurities.

The preferred embodiment of the apparatus further provides a distinct temperature profile over the distillation column that maintains different condensation conditions at each of the baffle positions along the height of the column, thereby facilitating the production of the ultra high purity magnesium, and the selective condensation of the high purity magnesium, particularly by cooperating with the selectively spaced baffles on which the deposited material is collected. The apparatus is automated with a computerized data acquisition and control system to maintain the optimum operating parameters and conditions that provide the highly selective distillation, and thereby the high purity of the material.

In the preferred embodiment of the invention, the crucible is heated to above the boiling point of the material to be purified, or to a temperature at which the vapor pressure of the material in the crucible exceeds the vacuum pressure level in the chamber in which the evaporation column is situated. This vacuum pressure is preferably a high vacuum of, for example $10^{-7}$ torr, at which the temperature of the crucible is preferably approximately 700° C., the lower portion of the condenser is maintained at preferably approximately 600° C., and the upper portion of the condenser is maintained at approximately 450° C. Preferably, two baffles near the top of the lower portion of the condenser restrict the upward flow of evaporated material while a baffle near the bottom of the upper portion of the condenser receives the major portion of the condensed material as it cools to below its boiling point. Additional baffles farther up in the upper portion further receive the condensed material or lower purity material or impurities.

In accordance with the present invention, there is provided a vapor distillation purification method and apparatus in which a vacuum distillation apparatus produces ultra high purity (greater than 99.9999%) magnesium, which is a purity higher than that produced by the prior art, using features that include (a) a sleeve design of top and bottom caps that enables column components to be inserted into each other and assembled without any external fastener, (b) a half-cylindrical design of the condenser allows easy removal of high-purity magnesium deposits, (c) internal grooves in the condenser to permit easy adjustment of baffle position and easy removal of purified deposit, (e) graphite baffles that create a zigzag path for magnesium vapor and allow increase contact surfaces between magnesium vapor and condenser, (f) a three or other multiple-zone heater that maintains a temperature profile from the bottom of the column to the top for ultra high purity, (g) computer automation that provides reliable operation, and (h) unique positioning of baffles for both high yield and purity.

This present invention produces magnesium, for example, of the highest purity available, exceeding 99.9999% metallic purity, excluding zinc content, and does so by a vacuum distillation that is less costly than the less effective methods of the prior art. Currently, ultra high purity magnesium that is commercially available has lower purity (99.9997% to 99.9998% metallic purity, excluding zinc content) and is more expensive than that produced by the current invention in part because the prior art systems that produce purified magnesium employ a more complicated multi-step process of purification, while the current invention utilized a single-step process. The principles of the present invention may be used for purification of metals other than magnesium, such as calcium, hafnium, zinc, tellurium, neodymium, manganese, zirconium, and titanium sponge, alloys including magnesium alloys, aluminum alloys; and compounds including iodides and chlorides. The apparatus of the present invention can be optimized by the selection and the placement of the baffles and the selective multi-level control of temperature and other process parameters so as to produce and isolate the materials of the highest purity.

These and other objectives of the present invention can be appreciated from the following detained description of the drawings in which:

DETAILED DESCRIPTION OF THE PREFERRED EMBODIMENT

Figure 1:
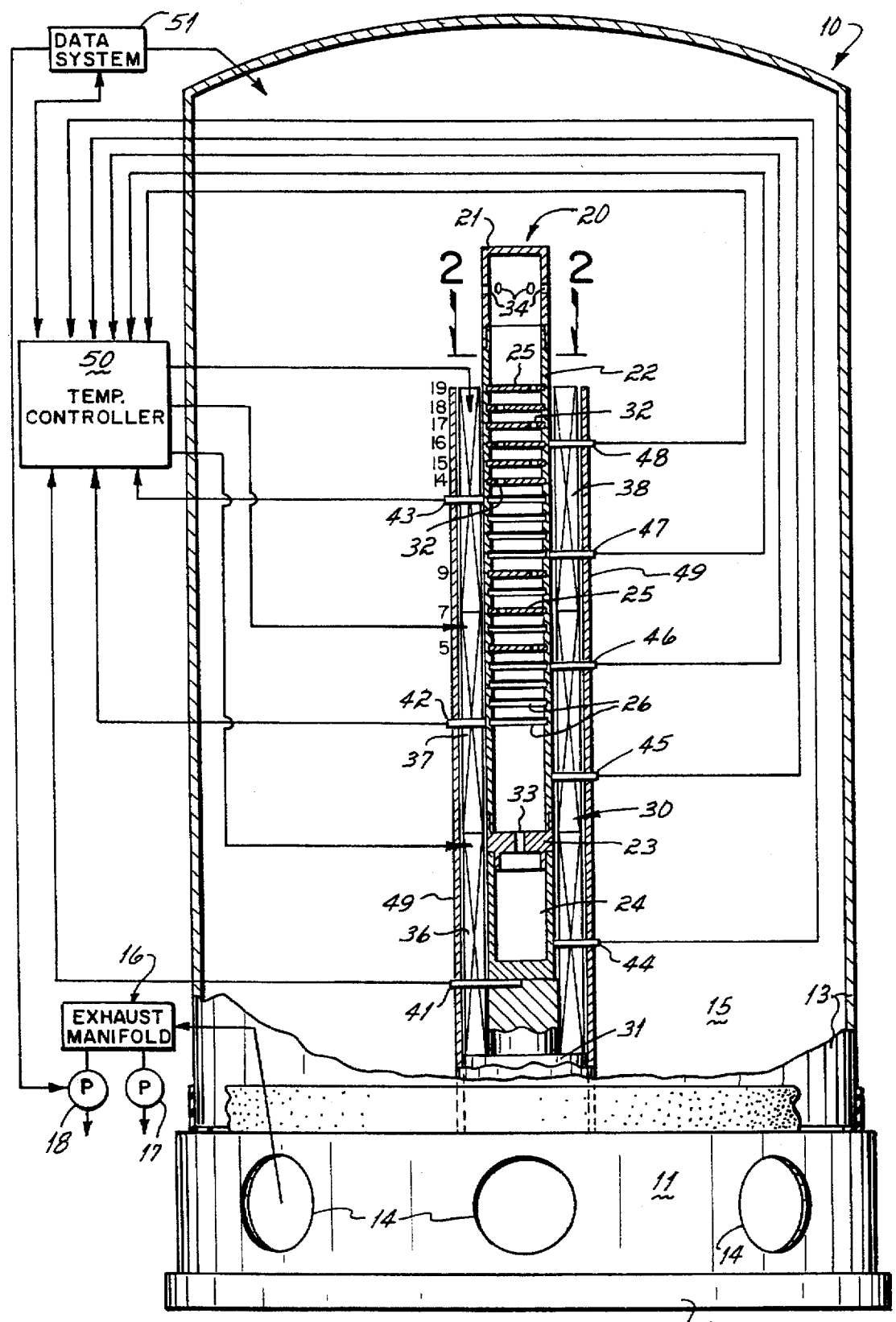
FIG. 1 is a side elevational diagram of a vapor distillation apparatus according to principles of the present invention.

One preferred embodiment of an apparatus 10, particularly configured for the production of ultra high purity magnesium according to the present invention, is illustrated in FIG. 1. The apparatus 10 includes a feedthrough collar or base 11 mounted on a base plate or support 12. On the top of the collar 11 a chamber housing 13 in the form of a downward facing vacuum bell jar of, for example, quartz, is mounted to form a vacuum tight seal with the collar 11. The collar 11 is provided with a plurality of vacuum feedthrough ports 14 that communicate between a vacuum chamber 15 inside of the housing 13 and a vacuum exhaust manifold, diagrammatically represented at 16, to which are connected a pair of vacuum pumps that include a high volume mechanical pump 17 and a cryogenic high vacuum pump 18.

Figure 2:
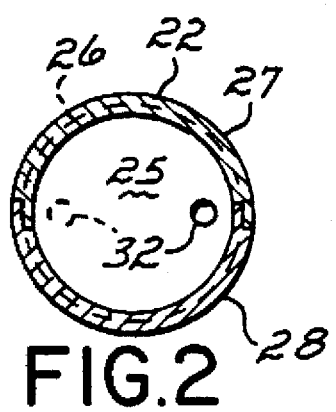
FIG. 2 is a cross-sectional view along the line 2—2 of FIG. 1.

Within the chamber 15 is supported, vertically upstanding from the base 12, a distillation column 20. The internal components of the column 20 are made preferably entirely of high purity graphite having an ash content of preferably not more than approximately 10 parts per million (ppm) by weight. The distillation column 20 includes a top condenser cap 21, a vertically disposed cylindrical condenser 22, a bottom cap 23, a crucible 24 and a plurality of baffles 25, for example nine in number, that occupy some but not all of a larger plurality of, for example, nineteen, baffle positions 26 vertically spaced at different heights along the height of the condenser 22. The condenser 22 is preferably cylindrical, having an inside diameter of preferably about 1.36 inches, and formed of two semi-cylindrical halves 27 and 28, about 0.4 inches thick, as illustrated in FIG. 2. The overall height of the column, from the bottom cap 23 to the cap 21, is preferably about 13.75 inches, with the cap 21 adding approximately another 2 inches to the space enclosed within the column 20 above the bottom cap 23.

The distillation column 20 is housed in a furnace assembly 30 that is supported by an alumina cylindrical block 31 fixed to top surface of the base 12, at the center thereof. The block 31 is located at the bottom of the distillation column 20 and acts as a support to the distillation column 20. The crucible 24 rests on the top of the block 31 and fittingly interconnects with the base of the condenser 22. As FIG. 2 illustrates, the two halves 27, 28 of the condenser 22 have stepped longitudinal edges and semi-circular ends to lap fit together and to fit into the top cap 21 at the top of the condenser 22 and into the bottom cap 23 at the bottom of the condenser 22 so that the caps 21 and 23 hold the halves 27 and 28 of the condenser 22 together thus avoiding the need for external fasteners. The lower cap similarly fits into a recess at the top of the crucible 24.

The baffles 25 each fit into aligned semicircular slots in each of the halves 27 and 28 of the condenser 22 that define the baffle positions 26. Each of the baffles 25 is probably in the form of a disk, about 0.12 inches thick, and has a circular hole 32 of about 7132 inches in diameter therein, which is spaced about 0.43 inches from the center thereof. The baffles 25 are preferably arranged in the condenser 22 such that the holes of the different baffles 25 of the plurality are alternately spaced on opposite sides of a vertical axis extending the length of the condenser 22 at the cylindrical center thereof. The bottom cap 23 is provided with a central hole 33 of approximately 3/16 inch diameter therein that allows vapors to rise from the crucible 2a, into the condenser 22, where they pass through each of the successive holes 32 in the baffles 25 until condensing on one of them. The vapors that do not condense in the condenser 22 continue to rise to the top of the condenser 22 until they reach the top cap 21, where they pass through any of six circumferentially spaced holes 34 in the cap 21, approximately one inch below the top of the cap 21 and approximately 1/4 inch in diameter, that communicate with the volume of the chamber 15. The top cap 21, condenser 22, bottom cap 23, crucible 24 and each of the baffles 25 is formed of high purity (preferably less than 10 ppm ash) graphite. The furnace assembly 30 that encloses the graphite distillation column 20 includes a three-zone resistance heater having three separately controllable heating elements 36, 37 and 38 located at different vertical elevations around the outside of the column 20, and three control thermocouples 41, 42 and 43 that are employed to control individual zone temperatures defined by the positions of the elements 36, 37 and 38. Five additional thermocouples 44–48 are provided at different vertical positions along the length of the column to more completely monitor temperature profile along the height of the condenser 22. The thermocouple 41 is inserted through the lower heater 36 to approximately the axial center of the column 20 between the crucible 24 and the cylindrical alumina block 31, and the thermocouples 42–48 are inserted through the heaters 36–38 and touch the outer surface of the condenser 22 of the distillation column 20. The furnace or heater 30 and the distillation column 20 are sheathed in a cylindrical alumina tube 49 that is open on both the top and bottom.

The crucible 24 is cup shaped with an open top end to receive a charge of material, such as magnesium, to be purified. The purity of the material to be purified is preferably above 99.9% pure, and, according to the advantages of the invention, need not be greater than 99.99% pure for the final distillation step that results in the 99.9999% pure material. In the configuration preferred for the refinement of magnesium, nine of the graphite baffles 25 are preferably placed in grooves or slots defining, counting from the bottom of the condenser 22, positions 26 numbered 5, 7, 9, 14, 15, 16, 17, 18, and 19, as is illustrated in FIG. 1. The alternate off-center placement of the baffle holes 32 provide a zigzag path for rising magnesium vapor and horizontal graphite surfaces to intercept and receive condensation of the magnesium.

In the illustrated embodiment for the production of ultra high purity magnesium, the internal diameter of the condenser 22 utilized was 1.36 inches, with the baffle positions being spaced 1/2 inch apart from 3 inches to 12 inches from the bottom of the condenser 22. The bottom cap 23 is approximately 1/2 inch thick and the depth of the well in the crucible 24 is approximately 3 inches below the bottom cap 23. The lower heating element 36 extends from below the bottom of the crucible 24 to the bottom cap 23, the middle heating element 37 extends from the bottom cap 23 to approximately the seventh baffle position 26 from the bottom, while the upper heating element 38 extends from the middle element 37 to the top most baffle position 26. The control thermocouples 41–43 are located, preferably, with the lowest control thermocouple 41 at the base of the crucible 24, the middle control thermocouple 42 located at the lowermost baffle position 26, and the upper control thermocouple 43 located at about the thirteenth baffle position 26 from the bottom. The monitoring thermocouples 44–48 are preferably located with the lowest one 44 about 1/2 inch from the bottom of the crucible 24, the second lowest one 45 approximately 1 1/2 inch from the bottom of the condenser 22, the middle one 46 approximately adjacent the fourth baffle position 26 from the bottom of the condenser 22, the fourth one 47 approximately adjacent the tenth baffle position 26, and the topmost one 48 approximately adjacent the sixteenth baffle position 26.

For control of the temperature of the condenser 22, there is provided a temperature controller 50 that includes three Eurotherm 818P temperature controllers, three variable transformers, and three solid state relays (not shown), to supply and regulate electric power to the heater elements 36–38. The three-zone heater formed by the elements 36–38 include six half-cylindrical resistance heating sections, two forming each of the elements 36–38.

The selected combination of baffles 25 are optimized together with the temperature settings for the materials being used. The baffle placement cooperates with the temperature settings of the multiple stage heater so as to best control the condensation of the unwanted impurities at certain lower ones of the baffles, condensation of the highest purity magnesium or other such material being purified at certain middle ones of the baffles, and to permit other impurities to pass beyond these certain middle ones of the baffles to condense on higher ones of the baffles or be exhausted from the holes 34 in the top cap 21.

The system is controlled by a computerized data acquisition and control system 51. The computerized system 51 controls automatic pump down to the appropriate vacuum levels by operating the pumps 17 and 18, including the switching from mechanical pump 17 to the cryo-pump 18, which brings the pressure within the chamber 15 preferably to less than $10^{-7}$ torr. The pressure and the temperature profile throughout the column 20 are interrelated so as to maintain the temperature along the condenser either above or below that required so that the vacuum pressure approximates the vapor pressures at such temperatures of the material being purified, e.g. magnesium, and of the contemplated impurities being removed. Generally, higher temperatures are required for higher pressures. The system 51 also controls the heat up after a desirable vacuum is attained, and maintains the temperatures at the desired levels for the duration of the distillation process, a duration of approximately two hours, and powers off the apparatus 10 at the end of the process. The computerized data acquisition and control system 51 is preferably a specially programmed general purpose computer, such as an IBM compatible 386 or 486 computer. The control lines between the computer and the temperature and pressure readouts and control signal inputs of the apparatus are preferably provided respectively with analog-to-digital digital-to-analog signal converters, such as, for example, provided with the use of a Keithley/Metrabyte DAC-20 analog/digital & digital/analog data acquisition board, a Keithley/Metrabyte EXP-20 high-speed, analog-input amplifier/multiplexer, a Keithley/Metrabyte DAC-02, a Keithley/Metrabyte DDA-06 Analog/Digital Expansion Board, and a Control EG software package. Further, current transducers are employed to detect short circuits in the heaters and shut off the heating system. Electrical relays are used to shut off the vacuum system if excessive gas leakage of the vacuum bell jar is detected.

In accordance with the preferred embodiment of the present invention, the process of purifying magnesium involves charging the graphite crucible 24 with about 45 grams of, for example, low purity (99.95% pure) magnesium turnings or pellets. Then, the other components of the column 20, which are the bottom cap 23, the condenser 22, and top cap 21, are assembled and placed on top of the crucible 24. The entire column 20 is then sheathed with the three-zone heater assembly 30 and then the alumina tube 49 is placed around the heater or furnace 30. Thermocouples 41–48 are then inserted into respective mounting holes in the heaters 36–38 provided therefor. The vacuum bell jar 13, or other chamber housing, is then placed over the assembly and lowered onto the feedthrough collar or base 12.

Then, a computer program is executed in the computer system 51 to start, control, and stop the process automatically. The sequence of operation of the apparatus 10 involves the pumping down of the chamber 15 within the bell jar 13 to less than $10^{-7}$ torr before the heaters are energized. Then, the upper zone heater 38, the center zone heater 37 and the lower zone heater 36 are respectively heated to 450° C., 600° C., and 690° C. as respectively controlled by control thermocouples 43, 42 and 41. For the production of the ultra high purity magnesium of the example of the illustrated embodiment, the temperature distribution along the distillation column 20, as particularly sensed at the upper three of the thermocouples 46–48, is preferably 594° C., 478° C. and 373° C., respectively. The temperature of the vapor at the holes 34 in the top cap 21 is approximately 254° C.

The temperatures are maintained at these levels for the duration of the distillation process, which is preferably approximately two hours. Then the heaters are turned off and the system is allowed to cool, while being maintained under a vacuum, preferably for about ten to fifteen hours. The system is then opened by removing the bell jar 13, the sleeve 49 and the heaters 36–38. Then the condenser 20 is disassembled by separating the halves 27, 28 and removing the individual baffles, maintaining each in isolation from contamination. The refined magnesium is found on the bottom surfaces of the baffles 25. Typical distribution of the refined deposits on the various baffles 25 produces the largest deposit on the bottom surface of the baffle 25 located in position number 9 (48% to 56%). The second largest deposit is found on the bottom surface of the baffle 25 located in position number 14 (26% to 35%). The highest purity deposit (greater than 99.9999% pure) is found on the baffle 25 located in position number 9. The yield of the highest purity deposit is approximately 25 grams per run, based on an initial charge of approximately 45 grams of low purity magnesium. The typical impurities found by glow discharge mass spectroscopy in the refined magnesium located in position number 9 as compared with that found prior art purified magnesium such as, for example, produced by the Dowa process, are compared in Table 1 below.

TABLE 1

Impurities in Refined Magnesium

| | Sample deposit at #9 Baffle ppm by weight | Sample of Dowa magnesium ppm by weight |
|---|---|---|
| Al | 0.025 | <0.030 |
| As | <0.010 | <0.010 |
| B | <0.005 | <0.005 |
| Bi | <0.010 | 0.006 |
| Ca | <0.020 | <0.010 |
| Cd | 0.018 | 0.606 |
| Co | <0.010 | <0.005 |
| Cr | <0.010 | 0.022 |
| Cu | <0.020 | 0.077 |
| Fe | <0.010 | 0.540 |
| Ga | <0.010 | <0.010 |
| In | <0.010 | <0.010 |
| K | <0.010 | 0.051 |
| Li | <0.005 | <0.005 |
| Mn | 0.041 | 0.020 |
| Mo | <0.010 | <0.010 |
| Na | 0.036 | 0.034 |
| Ni | <0.010 | 0.030 |
| Pb | 0.036 | 1.030 |
| Sb | 0.022 | <0.010 |
| Si | 0.226 | 0.139 |
| Sn | <0.010 | <0.020 |
| Th | <0.001 | <0.0005 |
| Ti | 0.010 | 0.024 |
| U | <0.001 | <0.0005 |
| V | <0.030 | <0.020 |
| Zn | 5.870 | 17.000 |
| Zr | 0.023 | 0.010 |
| Non-metal content | | |
| P | 0.02 | 0.03 |
| F | 0.01 | 0.01 |
| Cl | 0.15 | 0.01 |
| C | 14.50 | 11.80 |
| S | 16.90 | 32.00 |
| Total Metallic Purity | 99.99935% | 99.998% |
| Metallic Purity without Zinc | 99.99994% | 99.99973% |

Given the temperatures described in connection with the illustrated embodiment and the vacuum pressure provided in the chamber, at the baffle in the ninth position from the bottom, the magnesium vapor first drops below its vapor pressure when contacting the baffle, thereby condensing on the bottom surface of the baffle. For the magnesium vapors passing through the opening 32 in the baffle in this ninth position, most will condense upon contact with the baffle 25 in the fourteenth position, at which the temperature is only slightly lower than at the baffle in the ninth position. The most tolerable impurity, zinc, which has a vapor pressure near but below that of magnesium, will condense slightly with the magnesium, while some zinc and other higher vapor pressure impurities will condense at baffles at higher positions than the fourteenth position or pass out of the holes 34 into the cavity 15. Most of the undesirable impurities, which have lower vapor pressures than that of magnesium or the other low volatility material being purified will remain in the crucible 24 or condense on the baffles 25 in the fifth and seventh positions from the bottom.

The above described method and apparatus produces an ultra high purity material, with impurities of less than one part per million. Such a material may be a combination of one or more high volatility materials, such as those materials identified above. In the example, such a material is a combination of magnesium and zinc, in which the material impurities, that is materials other than magnesium or zinc, are less than 1 ppm. By selective placement of the baffles and selection and control of the temperatures, purification of one of the high volatility materials (e.g. magnesium) can be achieved by eliminating or reducing other such high volatility materials. In the example above, the initial charge of magnesium included zinc in an amount of 50.6 ppm, with the resulting material having a zinc content of 5.87 ppm. With such material as magnesium in such a process, magnesium containing zinc of between 5 and 10 ppm can easily be achieved. Where removal of more zinc is important, extrapolation of the principles of the present invention indicates that, by increasing baffles and temperature gradient in the column, reduction of zinc content to 4, 3 and 2 ppm is achievable, with 1 ppm theoretically achievable and approachable. Accordingly, such ultra high pure high volatility materials are provided by the present invention.

From the above description of the preferred embodiments of the invention, it will be apparent to one skilled in the art that variations and modifications can be made without departing from the principles of the invention.

Accordingly, the following is claimed:

1. A vacuum distillation apparatus for producing ultra high purity material comprising:

a vacuum chamber;

a distillation column upstanding vertically in the chamber, the column comprising a graphite crucible at the bottom thereof containing a volume for containing a charge of material to be purified for evaporation, and a graphite condenser extending upwardly from the crucible and having a hollow interior communicating with the volume of the crucible, the condenser having an opening at the top thereof communicating between the interior and the vacuum chamber;

the distillation column further comprising a plurality of graphite baffles for impeding the upward flow of vapors of evaporated material from the crucible through the condenser and through the opening toward the vacuum chamber, the baffles being located one each at each of a plurality of vertically spaced positions along the condenser;

a plurality of separately controllable zone heaters spaced along the condenser, including a first heater adjacent the crucible and a second heater spaced above the first heater;

a heater control connected to the heaters and set to control the heaters to maintain temperature of the distillation column at a plurality of different temperatures, including a first temperature at the crucible that is above the evaporation temperature of the material, a second temperature that is lower than the first temperature below at least one of the positions, and a third temperature that is lower than the second temperature and is less than the condensation temperature of the ultra-high purity material adjacent at least one of the positions.

2. The apparatus of claim 1, further comprising:

means, including the separately controllable zone heaters and the heater control, for evaporating material in the crucible, for maintaining the temperature of graphite surfaces on at least one baffle of the plurality to condense the evaporated material thereon, and for maintaining the temperature of graphite surfaces in the condenser between the at least one baffle and the crucible high enough to avoid substantial condensation of the material thereon.

3. The apparatus of claim 1 wherein: the plurality of separately controllable zone heaters includes at least three zone heaters including a third heater vertically positioned between the first and second zone heaters; and the heater control is connected to the second and third heaters and set to control the second and third heaters to respectively maintain the second and third temperatures of the distillation column.

4. The apparatus of claim 1 wherein:

the plurality of positions include more than one position that each include a support for holding a baffle therein, and the plurality of baffles includes at least one baffle that is removably mounted in a one of the supports.

5. The apparatus of claim 4 wherein:

each of the supports is a similarly dimensioned groove formed in the condenser in the interior thereof and the at least one baffle is dimensioned to fit in the groove.

6. The apparatus of claim 4 wherein:

the condenser includes a split housing that is openable to provide access to the removable baffle and supports.

7. The apparatus of claim 1 wherein:

each of the baffles of the plurality has a non-concentric vapor passage therein and adjacent baffles of the plurality are oriented at their respective positions such that the passages present a staggered path for vapors rising in the condenser.

8. The apparatus of claim 1 wherein:

the condenser includes a pair of elongated semi-cylindrical interfitting sections adapted to form a cylinder.

9. The apparatus of claim 1 wherein:

the condenser includes a longitudinally split housing that is openable to provide access to the interior thereof; and the column includes at least one end cap configured to hold the split housing together when connected thereto.

10. The apparatus of claim 1 wherein:

the condenser includes graphite parts formed of high purity graphite.

11. The apparatus of claim 10 wherein:

the high purity graphite has an ash content of not more than ten parts per million by weight.

* * * * *